(12) United States Patent
Chen et al.

(10) Patent No.: US 11,100,135 B2
(45) Date of Patent: Aug. 24, 2021

(54) SYNCHRONOUS REPLICATION IN A STORAGE SYSTEM

(71) Applicant: EMC IP Holding Company LLC, Hopkinton, MA (US)

(72) Inventors: Xiangping Chen, Sherborn, MA (US); Zvi Schneider, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/038,543

(22) Filed: Jul. 18, 2018

(65) Prior Publication Data

US 2020/0026794 A1 Jan. 23, 2020

(51) Int. Cl.
*G06F 16/27* (2019.01)
*G06F 11/14* (2006.01)

(52) U.S. Cl.
CPC ........ *G06F 16/275* (2019.01); *G06F 11/1469* (2013.01); *G06F 2201/84* (2013.01)

(58) Field of Classification Search
CPC .............. G06F 16/275; G06F 11/1469; G06F 2201/84
See application file for complete search history.

(56) References Cited

U.S. PATENT DOCUMENTS

| | | |
|---|---|---|
| 5,504,861 A | 4/1996 | Crockett et al. |
| 5,615,329 A | 3/1997 | Kern et al. |
| 7,278,049 B2 | 10/2007 | Bartfai et al. |
| 7,475,124 B2 | 1/2009 | Jiang et al. |
| 8,327,103 B1 | 12/2012 | Can et al. |
| 8,332,354 B1 * | 12/2012 | Chatterjee ........... G06F 11/1461 707/624 |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |

(Continued)

OTHER PUBLICATIONS

U.S. Appl. No. 16/048,767, filed Jul. 30, 2018, Chen et al.

(Continued)

*Primary Examiner* — Pierre M Vital
*Assistant Examiner* — Zuheir A Mheir
(74) *Attorney, Agent, or Firm* — Daly, Crowley Mofford & Durkee, LLP (57) ABSTRACT

In one aspect, data replication processes include setting a minimum snap set creation interval, a maximum snap set creation interval, and a recovery time threshold (RTT). An aspect further includes creating snap sets during a synchronous replication process based on the snap set creation intervals and the RTT. The snap set creation further includes monitoring an amount of data changes since the last snap set creation, monitoring throughput statistics between a source and target system, and estimating an amount of time to replicate the data changes to the target system based on the data changes and throughput statistics. Upon determining the time to replicate the data changes reaches the RTT and the time since the last snap set creation passes the minimum interval, the snap set creation includes creating a next snap set, storing the next snap set at the source, and replicating the next snap set at the target.

17 Claims, 5 Drawing Sheets

(56) References Cited

U.S. PATENT DOCUMENTS

| | | | |
|---|---|---|---|
| 8,583,607 | B1 | 11/2013 | Chen et al. |
| 8,683,153 | B1 | 3/2014 | Long et al. |
| 8,712,976 | B1 | 4/2014 | Chen et al. |
| 8,751,878 | B1 | 6/2014 | Don et al. |
| 8,775,388 | B1 | 7/2014 | Chen et al. |
| 8,782,324 | B1 | 7/2014 | Chen et al. |
| 8,799,601 | B1 | 8/2014 | Chen et al. |
| 8,898,507 | B1 * | 11/2014 | Grable ............... G06F 11/2074 714/4.11 |
| 8,909,887 | B1 | 12/2014 | Armangau et al. |
| 8,930,746 | B1 | 1/2015 | Chen et al. |
| 8,954,699 | B1 | 2/2015 | Chen et al. |
| 8,977,812 | B1 | 3/2015 | Chen et al. |
| 9,152,336 | B1 | 10/2015 | Chen et al. |
| 9,304,889 | B1 | 4/2016 | Chen et al. |
| 9,355,112 | B1 | 5/2016 | Armangau et al. |
| 9,384,206 | B1 | 7/2016 | Bono et al. |
| 9,395,937 | B1 | 7/2016 | Si et al. |
| 9,405,628 | B2 * | 8/2016 | Blea ................... G06F 11/2082 |
| 9,449,011 | B1 | 9/2016 | Chen et al. |
| 9,459,809 | B1 | 10/2016 | Chen et al. |
| 9,460,102 | B1 | 10/2016 | Bono et al. |
| 9,477,431 | B1 | 10/2016 | Chen et al. |
| 9,513,814 | B1 | 12/2016 | Can et al. |
| 9,529,545 | B1 | 12/2016 | Bono et al. |
| 9,542,125 | B1 | 1/2017 | Chen |
| 9,594,514 | B1 | 3/2017 | Bono et al. |
| 9,613,040 | B2 * | 4/2017 | Olson .................... G06F 3/065 |
| 9,684,593 | B1 | 6/2017 | Chen et al. |
| 9,710,187 | B1 | 7/2017 | Si et al. |
| 9,811,288 | B1 | 11/2017 | Chen et al. |
| 9,817,606 | B1 * | 11/2017 | Byrne .................... G06F 3/067 |
| 9,817,766 | B1 | 11/2017 | Si et al. |
| 10,037,369 | B1 | 7/2018 | Bono et al. |
| 10,068,002 | B1 | 9/2018 | Wilczynski et al. |
| 10,082,959 | B1 | 9/2018 | Chen et al. |
| 10,095,428 | B1 | 10/2018 | Meiri et al. |
| 10,152,381 | B1 | 12/2018 | Shvaiger et al. |
| 10,169,163 | B2 * | 1/2019 | Anglin ............... G06F 11/1451 |
| 10,176,046 | B1 | 1/2019 | Hu et al. |
| 10,235,066 | B1 | 3/2019 | Chen et al. |
| 10,802,935 | B2 * | 10/2020 | Chen ................... G06F 11/2082 |
| 2005/0021751 | A1 | 1/2005 | Block et al. |
| 2005/0071708 | A1 | 3/2005 | Bartfai et al. |
| 2008/0232405 | A1 | 9/2008 | Gallo |
| 2009/0164531 | A1 | 6/2009 | Tanaka et al. |
| 2011/0321041 | A1 | 12/2011 | Bhat et al. |
| 2014/0279897 | A1 * | 9/2014 | Bourbonnais ........... G06F 16/27 707/634 |
| 2016/0048408 | A1 * | 2/2016 | Madhu ............... G06F 11/2023 718/1 |
| 2016/0139823 | A1 * | 5/2016 | Costea .................. G06F 3/0619 711/162 |
| 2016/0147855 | A1 * | 5/2016 | Bhagat .................. G06F 3/0607 707/620 |
| 2016/0239396 | A1 | 8/2016 | Deng et al. |
| 2017/0149870 | A1 * | 5/2017 | Arnold ................... H04L 67/101 |
| 2017/0185323 | A1 | 6/2017 | Kaushik et al. |
| 2017/0192857 | A1 * | 7/2017 | Meiri ..................... G06F 16/273 |
| 2017/0262520 | A1 * | 9/2017 | Mitkar .................. G06F 16/275 |
| 2019/0163370 | A1 * | 5/2019 | Sure ..................... G06F 11/1451 |
| 2019/0278663 | A1 * | 9/2019 | Mehta .................... G06F 3/067 |
| 2019/0356609 | A1 | 11/2019 | Grunwald et al. |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 21, 2018, Chen et al.
U.S. Appl. No. 16/042,363, filed Jul. 23, 2018, Chen et al.
Non-Final Office Action dated Mar. 30, 2020, U.S. Appl. No. 16/042,363, 18 pages.
Response to Non Final Office Action filed Apr. 15, 2020, U.S. Appl. No. 16/042,363, 13 pages.
Notice of Allowance and Issue Fee Due dated May 5, 2020, U.S. Appl. No. 16/042,363, 9 pages.
U.S. Non-Final Office Action dated Oct. 7, 2020 for U.S. Appl. No. 16/254,897; 25 pages.
Response to U.S. Non-Final Office Action dated Oct. 7, 2020 for U.S. Appl. No. 16/254,897; Response filed on Oct. 29, 2020; 11 pages.
Notice of Allowance dated Jan. 7, 2021 for U.S. Appl. No. 16/254,897; 11 pages.
Notice of Allowance dated Apr. 27, 2021 for U.S. Appl. No. 16/254,897; 9 pages.

* cited by examiner

SYNCHRONOUS REPLICATION IN A STORAGE SYSTEM

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

Since data are continuously written to a source system and a target system, to create a pair of synchronized snap sets when sync replication is enabled, the system has to suspend host input/output (I/O) operations and drain in-flight I/Os. However, the time period involved in pausing and draining I/Os and creating snap sets may cause major I/O latency hiccups for applications, which is neither desirable nor practical in real customer environments having steady or low I/O latency requirements.

Existing time-based snapshot creation policies that are utilized to address the above-described challenges do not adapt to the workload of the storage volumes, nor do they provide recovery time guarantees.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performing synchronous replication processes in a storage system. The method includes setting, via a storage system, a minimum snap set creation interval, a maximum snap set creation interval, and a recovery time threshold. The method also includes periodically creating, at a source system of the storage system, snap sets during a synchronous replication process based on the minimum and maximum snap set creation intervals and the recovery time threshold. Creating the snap sets includes monitoring an amount of data changes since last snap set creation, monitoring throughput statistics between the source system and a target system of the storage system, and estimating an amount of time to replicate the data changes to the target system based on the amount of data changes and the throughput statistics. Upon determining both the time to replicate the data changes reaches the recovery time threshold and the time since the last snap set creation passes the minimum snap set creation interval, the method includes creating a next snap set, storing the next snap set at the source system, and replicating the next snap set at the target system.

Another aspect may provide a system performing synchronous replication processes in a storage system. The system includes a memory having computer-executable instructions. The system also includes a processor operated by a storage system. The processor executes the computer-executable instructions. When executed by the processor, the computer-executable instructions cause the processor to perform operations. The operations include setting a minimum snap set creation interval, a maximum snap set creation interval, and a recovery time threshold. The method also includes periodically creating, at a source system of the storage system, snap sets during a synchronous replication process based on the minimum and maximum snap set creation intervals and the recovery time threshold. Creating the snap sets includes monitoring an amount of data changes since last snap set creation, monitoring throughput statistics between the source system and a target system of the storage system, and estimating an amount of time to replicate the data changes to the target system based on the amount of data changes and the throughput statistics. Upon determining both the time to replicate the data changes reaches the recovery time threshold and the time since the last snap set creation passes the minimum snap set creation interval, the method includes creating a next snap set, storing the next snap set at the source system, and replicating the next snap set at the target system.

Another aspect may provide a computer program product embodied on a non-transitory computer readable medium. The computer program product includes instructions that, when executed by a computer at a storage system, causes the computer to perform operations. The operations include setting a minimum snap set creation interval, a maximum snap set creation interval, and a recovery time threshold. The method also includes periodically creating, at a source system of the storage system, snap sets during a synchronous replication process based on the minimum and maximum snap set creation intervals and the recovery time threshold. Creating the snap sets includes monitoring an amount of data changes since last snap set creation, monitoring throughput statistics between the source system and a target system of the storage system, and estimating an amount of time to replicate the data changes to the target system based on the amount of data changes and the throughput statistics. Upon determining both the time to replicate the data changes reaches the recovery time threshold and the time since the last snap set creation passes the minimum snap set creation interval, the method includes creating a next snap set, storing the next snap set at the source system, and replicating the next snap set at the target system.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide synchronous replication processes in a storage system. The synchronous replication processes optimize recovery snap set creation scheduling processes to ensure fast incremental while minimizing the cost of snap set management.

In lieu of synchronized snap sets between source and target systems, the synchronous replication processes provide a new concept referred to herein as a "recovery snap set." Recovery snap sets are created in pairs on source and target systems. For each pair, the source side snap set is a subset of the target side snap set. In some types of storage systems, such as XtremIO, it is known that a snap set may be used in a sync replication if it is created earlier than a maximum defined I/O timeout value, e.g., 30 seconds. In applying this I/O time value of 30 seconds, by way of illustration, and given a system designed to guarantee that all I/Os are served within the maximum timeout value, if a snap set is created on the source system 30 seconds ago, then all data that are saved in this snap set must also be completed on the target system.

If snap sets are continuously created during sync replication, then a snap set that is older than 30 seconds should be readily available for incremental recovery and re-sync. However, the interval or frequency of snap set creation needs to be carefully considered. For example, if a snap set is created every 30 seconds on both the source and target systems, then in a worst-case scenario, it may be possible that a snap set on the source system to be used in recovery may be 60 seconds old. Further, if a failover is to be performed, then the recovery snap set available for use from the target system could be as old as 90 seconds. Thus, the recovery process will need to re-sync/re-transfer all the data accumulated during the past 90 seconds before the system reaches a state of sync, which may cause system load fluctuations for an extended period of time. If, however, the snap creation interval is shortened to a smaller value, it may cause frequent snap set creation and deletion, which would increase the load of the system to create/remove/merge snap sets.

As will be described further herein, the synchronous replication processes provide a two-factor recovery snap set creation schedule for sync replication that is based on a projected recovery/re-sync time.

Figure 1:
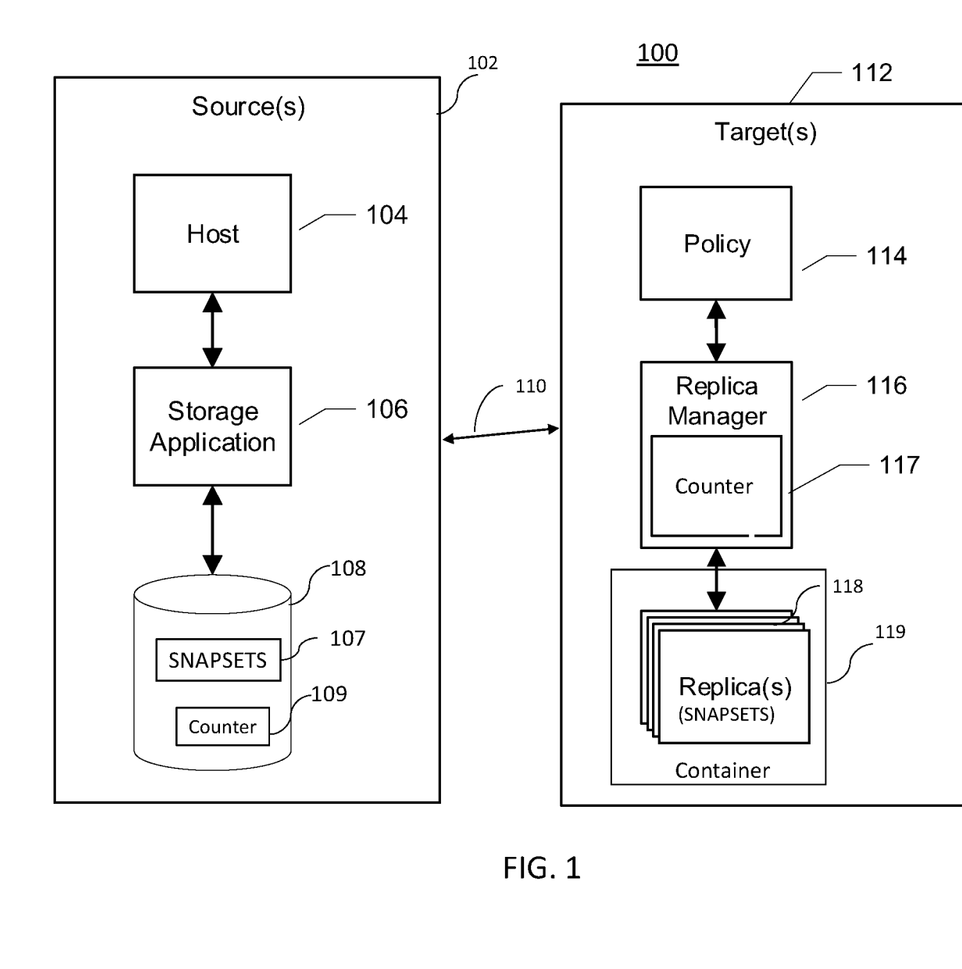
FIG. 1 is a block diagram of a storage system to perform synchronous replication processes in accordance with an illustrative embodiment.

Turning now to FIG. 1, an example storage system 100 for implementing synchronous replication processes will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, storage application 106, and data storage 108. In some embodiments, storage 108 may include one or more storage volumes (not shown), that operate as active or production volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110. In some embodiments, the communication network 110 may include internal (e.g., short distance) communication links (not shown) to transfer data between storage volumes for storing replicas 107 and 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle by data replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations. For example, metrics include a minimum snap set creation interval, a maximum snap set creation interval, and a recovery time threshold. The minimum snap set creation interval refers to a minimum amount of elapsed time between a previously created snap set and a next snap set to be created. The maximum snap set creation interval refers to a maximum elapsed time between a previously created snap set and a next snap set to be created. The recovery time threshold refers to a target of time frame to reach sync state between the source and target systems during a recovery operation. The snap set creation intervals and the recovery time threshold are described further herein.

As described herein, in example embodiments, data replication may be synchronous data replication with snap sets created in dynamic intervals during operation of storage system 100. The timing of synchronous replication cycles and the retention of the replicas 118 may be managed by replica manager 116 of target site 112.

In addition to managing replicas 118 according to a policy 114 (e.g., a replication and/or retention policy), the replica manager 116 may also include a cycle counter 117 to track generations of snap sets over time, as will be described further herein.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site.

Figure 2:
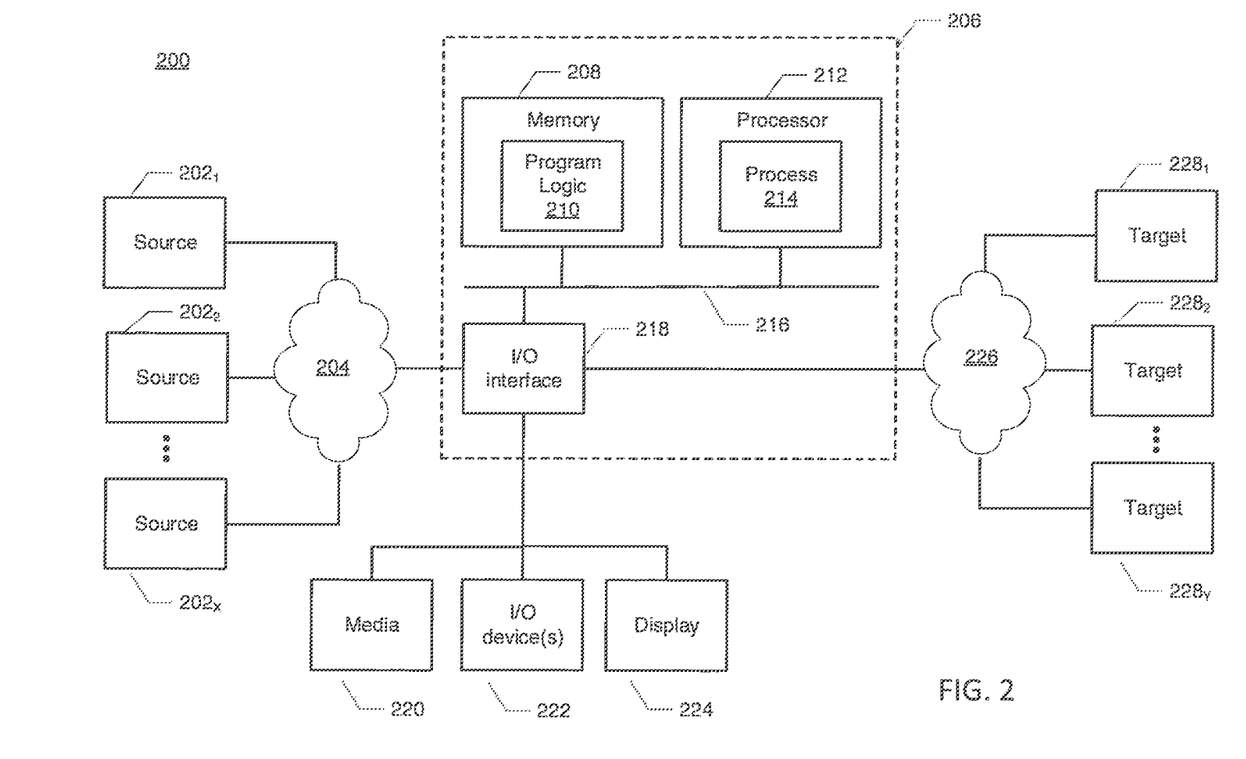
FIG. 2 is a block diagram of another storage system to perform synchronous replication processes in accordance with an illustrative embodiment.

Referring to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an InfiniBand (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3:
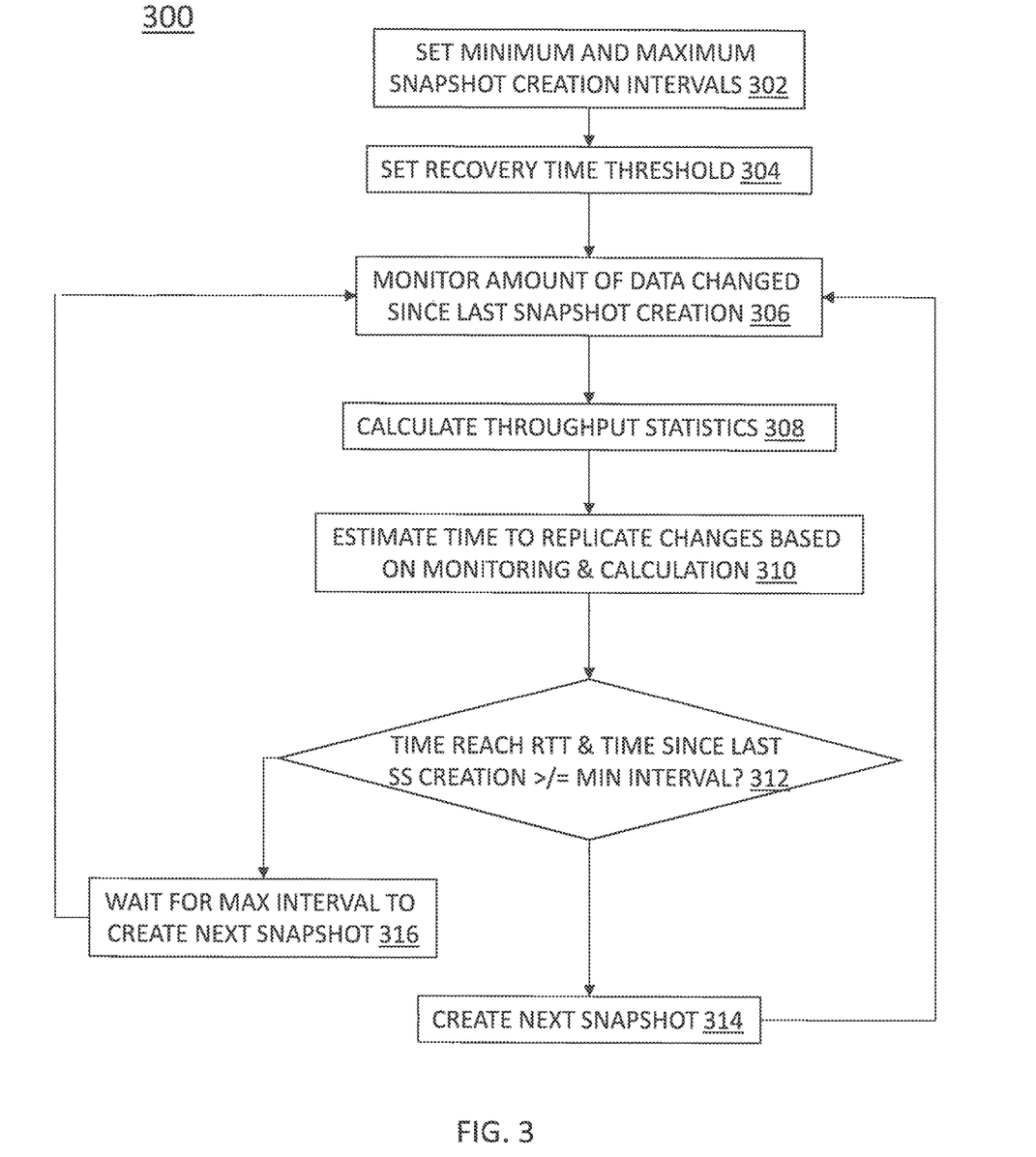
FIG. 3 is a flow diagram of a process to perform synchronous replication processes in accordance with an illustrative embodiment.

Turning now to FIG. 3, a process 300 for implementing the synchronous replication processes will now be described in accordance with illustrative embodiments. The process 300 may be implemented, e.g., by the storage application 106 of FIG. 1. In an embodiment, the process 300 may correspond to the process 214 shown in FIG. 2. The process 300 assumes that at least a first snap set has been created at the source system, which provides a point of reference in measuring elapsed time between snap set creation, as will be described further in FIG. 3. In the process of FIG. 3, a source system refers to a source site (e.g., site 102 of FIG. 1) or a source device 202 of FIG. 2. A target system refers to a target site 112 of FIG. 1 or one of target devices 228 of FIG. 2.

In block 302, the process 300 creates a minimum snap set creation interval and a maximum snap set creation interval. In an embodiment, the minimum snap set creation interval refers to a minimum amount of elapsed time between a previously created snap set and a next snap set to be created. In other words, the minimum snap set creation interval refers to a minimum amount of time that must elapse, with respect to a previously created snap set, before a next snap set is created. For example, a minimum snap set creation interval may be 5 seconds.

In an embodiment, the maximum snap set creation interval refers to a maximum elapsed time between a previously created snap set and a next snap set to be created. In other words, the maximum snap set creation interval refers to a maximum amount of time that must elapse, with respect to a previously created snap set, before a next snap set is created. For example, a maximum snap set creation interval may be 60 seconds.

In block 304, the process 300 sets a recovery time threshold. The recovery time threshold refers to a target of time frame to reach sync state between the source and target systems during a recovery operation. In an embodiment, the minimum and maximum snap set creation intervals and the recovery time threshold may be user-tunable parameters implemented, e.g., via an application interface at the host system 104 or at the target system 112 of FIG. 1, or via the apparatus 206 of FIG. 2. For example, the application interface may be implemented via the I/O interface 218 shown in FIG. 2. In alternative embodiments, the minimum and maximum snap set creation intervals and recovery time threshold may be default system parameters.

In block 306, during sync replication, the process 300 monitors the amount of data changes that have occurred since the last snap set creation. In an embodiment, the amount of data changes, in response to I/O operations, is determined as a measure of a difference in data via updates received by the source system. The measure of the difference may be tracked via a counter at the source system (e.g., via a counter 109 of FIG. 1).

In block 308, the process 300 calculates throughput statistics. In an embodiment, the process 300 monitors latency between the source and target systems. Latency values can be affected by workload variations and may change periodically. The process 300 monitors these statistics for use in determining when to adjust the snap set creation intervals.

In block 310, the process 300 estimates an amount of time to replicate changes to the target system based on the monitoring and calculation. For example, the greater the data changes and/or the greater the latency calculation, the more time it may take to replicate the changes, while the fewer the data changes and/or the lower the latency calculation, the less time it may take to replicate the changes.

At block 312, it is determined whether the elapsed time has reached the recovery time threshold and whether the time since the last snap set creation is greater than or equal to the minimum snap set creation interval. If the elapsed time has reached the recovery time threshold and the time since the last snap set creation is greater than or equal to the minimum snap set creation interval, this means that conditions for creating a new snap set are optimal, in order to minimize the recovery time and system load.

At block 314, if the elapsed time has reached the recovery time threshold and the amount of time since the last snap set creation is greater than or equal to the minimum interval, the process 300 creates the next snap set. Otherwise, the process 300 waits for the maximum snap set creation interval to be met at block 316 before creating the next snap set. The snap set is stored at the source system and is replicated to the target system. The process at blocks 314 and 316 reverts back to block 306.

If there are more data written/changes, the system is dynamically adjustable to create snap sets at a greater frequency in order to minimize data re-sync efforts and recovery time. Additionally, if the latency calculation is high, the system is dynamically adjustable to adjust (e.g., reduce) the frequency of the snap set creation. Likewise, if there are less data changes, the system is adjustable to create snap sets at a lesser frequency. Thus, this process 300 is dynamically adjustable with respect to snap set creation frequency based on the recovery time objective and workload nature of each replication set up to achieve the most optimal use of the system resources.

In the event of a failover, the synchronous replication process may perform incremental recovery for synchronous replication. Incremental resynchronization is described in commonly assigned U.S. Publication No. 2020/0026627, filed on Jul. 23, 2018 which is incorporated herein by reference in its entirety.

Figure 4:
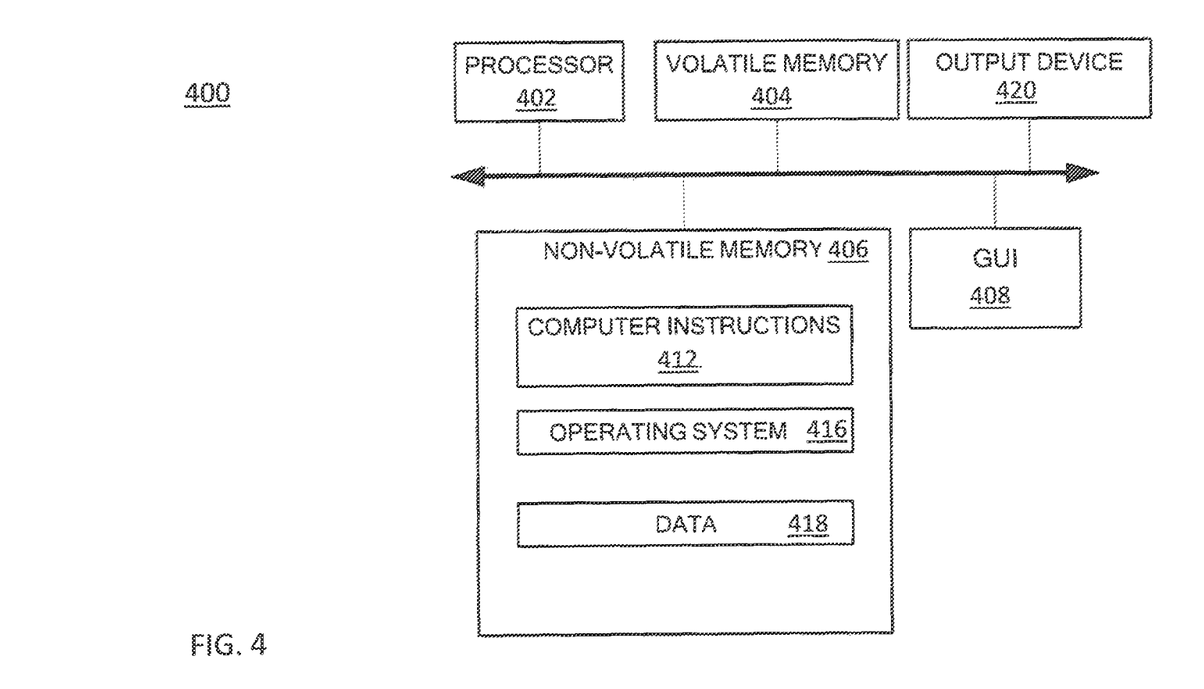
FIG. 4 is a block diagram of a hardware device that may perform at least a portion of the process shown in FIG. 3.

Referring to FIG. 4, in some embodiments, the source site 102 and/or target site 112 may be implemented as one or more computers. Computer 400 may include processor 402, volatile memory 404 (e.g., RAM), non-volatile memory 406 (e.g., a hard disk drive, solid state drive such as a flash drive, a hybrid magnetic and solid state drive, etc.), graphical user interface (GUI) 408 (e.g., a mouse, a keyboard, a display, and so forth) and input/output (I/O) device 420. Non-volatile memory 406 stores computer instructions 412, an operating system 416 and data 418 such that, for example, the computer instructions 412 are executed by the processor 402 out of volatile memory 404 to perform at least a portion of the process 300 shown in FIG. 3. Program code may be applied to data entered using an input device of GUI 408 or received from I/O device 420.

Process 300 shown in FIG. 3 is not limited to use with the hardware and software of FIG. 4 and may find applicability in any computing or processing environment and with any type of machine or set of machines that is capable of running a computer program. Process 300 shown in FIG. 3 may be implemented in hardware, software, or a combination of the two.

The processes described herein are not limited to the specific embodiments described. For example, process 300 is not limited to the specific processing order shown in FIG. 3. Rather, one or more blocks of process 300 may be re-ordered, combined or removed, performed in parallel or in serial, as necessary, to achieve the results set forth herein.

Processor 402 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIG. 3, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 5:
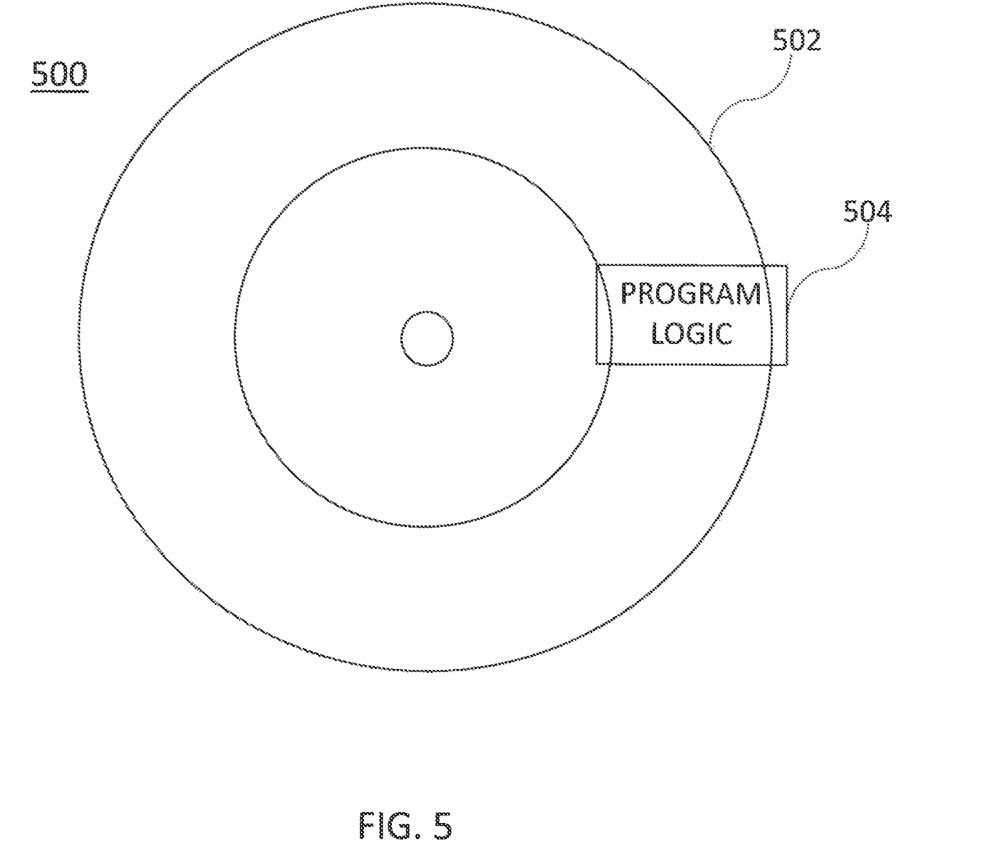
FIG. 5 a simplified block diagram of an apparatus that may be used to implement at least a portion of the systems of FIGS. 1-2 and 4 and at least a portion of the process of FIG. 3.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 5 shows Program Logic 504 embodied on a computer-readable medium 502 as shown, and wherein the Logic is encoded in computer-executable code configured for carrying out the reservation service process of this invention and thereby forming a Computer Program Product 500. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method, comprising:
   setting, via a storage system, a minimum snap set creation interval, the minimum snap set creation interval specifying a minimum amount of elapsed time between a previously created snap set and a next snap set to be created;
   setting, via the storage system, a maximum snap set creation interval, the maximum snap set creation interval specifying a maximum amount of elapsed time between the previously created snap set and the next snap set to be created, wherein the maximum amount of elapsed time is greater than the minimum amount of elapsed time;
   setting, via the storage system, a recovery time threshold;
   creating, at a source system of the storage system, snap sets during a synchronous replication process based on the minimum and maximum snap set creation intervals and the recovery time threshold, the creating snap sets comprising:
      monitoring I/O operations to determine an amount of data changes since a last snap set creation, the amount of data changes being a measure of a difference in data via updates received by the source system;
      monitoring throughput statistics between the source system and a target system of the storage system;
      estimating an amount of time to replicate the data changes to the target system based on the amount of data changes since the last snap set creation and the throughput statistics;
      upon determining both the time to replicate the data changes since the last snap set creation reaches the recovery time threshold and the time since the last snap set creation exceeds the minimum snap set creation interval:
         creating a next snap set;
         storing the next snap set at the source system; and
         replicating the next snap set at the target system; and
      upon determining the time to replicate the data changes does not reach the recovery time threshold, waiting until the maximum snap set creation interval has been reached before creating the next snap set.

2. The method of claim 1, wherein the throughput statistics comprise a latency metric between the source system and the target system.

3. The method of claim 1, wherein:
   the recovery time threshold comprises a target time frame to reach a synchronous state during a recovery operation.

4. The method of claim 1, wherein the amount of data changes comprises a measure of a difference in data via updates received by the source system, the measure of the difference tracked via a counter at the source system.

5. The method of claim 1, further comprising, in response to a failover event:
   performing, via the storage system, incremental synchronous replication between the source system and the target system.

6. The method of claim 1, wherein the minimum and maximum snap set creation intervals and the recovery time threshold are user-tunable parameters.

7. A system, comprising:
a memory comprising computer-executable instructions; and
a processor operable by a storage system, the processor executing the computer-executable instructions, the computer-executable instructions when executed by the processor cause the processor to perform operations comprising:
setting a minimum snap set creation interval, the minimum snap set creation interval specifying a minimum amount of elapsed time between a previously created snap set and a next snap set to be created;
setting a maximum snap set creation interval, the maximum snap set creation interval specifying a maximum amount of elapsed time between the previously created snap set and the next snap set to be created, wherein the maximum amount of elapsed time is greater than the minimum amount of elapsed time;
setting a recovery time threshold;
creating, at a source system of the storage system, snap sets during a synchronous replication process based on the minimum and maximum snap set creation intervals and the recovery time threshold, the creating snap sets comprising:
monitoring I/O operations to determine an amount of data changes since a last snap set creation, the amount of data changes being a measure of a difference in data via updates received by the source system;
monitoring throughput statistics between the source system and a target system of the storage system;
estimating an amount of time to replicate the data changes to the target system based on the amount of data changes since the last snap set creation and the throughput statistics; and
upon determining both the time to replicate the data changes since the last snap set creation reaches the recovery time threshold and the time since the last snap set creation exceeds the minimum snap set creation interval:
creating a next snap set;
storing the next snap set at the source system; and
replicating the next snap set at the target system; and
upon determining the time to replicate the data changes does not reach the recovery time threshold, waiting until the maximum snap set creation interval has been reached before creating the next snap set.

8. The system of claim 7, wherein the throughput statistics comprise a latency metric between the source system and the target system.

9. The system of claim 7, wherein:
the recovery time threshold comprises a target time frame to reach a synchronous state during a recovery operation.

10. The system of claim 7, wherein the amount of data changes comprises a measure of a difference in data via updates received by the source system, the measure of the difference tracked via a counter at the source system.

11. The system of claim 7, further comprising, in response to a failover event, the operations further include:
performing incremental synchronous replication between the source system and the target system.

12. The system of claim 7, wherein the minimum and maximum snap set creation intervals and the recovery time threshold are user-tunable parameters.

13. A computer program product embodied on a non-transitory computer readable medium, the computer program product including instructions that, when executed by a computer, causes the computer to perform operations comprising:
setting a minimum snap set creation interval, the minimum snap set creation interval specifying a minimum amount of elapsed time between a previously created snap set and a next snap set to be created;
setting a maximum snap set creation interval, the maximum snap set creation interval specifying a maximum amount of elapsed time between the previously created snap set and the next snap set to be created, wherein the maximum amount of elapsed time is greater than the minimum amount of elapsed time;
setting a recovery time threshold;
creating, at a source system of the storage system, snap sets during a synchronous replication process based on the minimum and maximum snap set creation intervals and the recovery time threshold, the creating snap sets comprising:
monitoring I/O operations to determine an amount of data changes since a last snap set creation, the amount of data changes being a measure of a difference in data via updates received by the source system;
monitoring throughput statistics between the source system and a target system of the storage system;
estimating an amount of time to replicate the data changes to the target system based on the amount of data changes since the last snap set creation and the throughput statistics;
upon determining both the time to replicate the data changes since the last snap set creation reaches the recovery time threshold and the time since the last snap set creation exceeds the minimum snap set creation interval:
creating a next snap set;
storing the next snap set at the source system; and
replicating the next snap set at the target system; and
upon determining the time to replicate the data changes does not reach the recovery time threshold, waiting until the maximum snap set creation interval has been reached before creating the next snap set.

14. The computer program product of claim 13, wherein the throughput statistics comprise a latency metric between the source system and the target system.

15. The computer program product of claim 13, wherein:
the recovery time threshold comprises a target time frame to reach a synchronous state during a recovery operation.

16. The computer program product of claim 13, wherein the amount of data changes comprises a measure of a difference in data via updates received by the source system, the measure of the difference tracked via a counter at the source system.

17. The computer program product of claim 13, further comprising, in response to a failover event, the operations further include:
performing incremental synchronous replication between the source system and the target system.

* * * * *